(12) United States Patent
Clapp

(10) Patent No.: US 6,424,755 B1
(45) Date of Patent: Jul. 23, 2002

(54) SLOTTED MONOLITHIC OPTICAL WAVEGUIDES

(75) Inventor: Terry Victor Clapp, Standon Herts (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/346,320

(22) Filed: Jul. 2, 1999

(51) Int. Cl.[7] .............................. G02F 1/03; G02B 6/12; G02B 6/10
(52) U.S. Cl. .................. 385/3; 385/2; 385/8; 385/9; 385/14; 385/50; 385/129; 385/132
(58) Field of Search ................................ 385/2, 3, 8, 9, 385/10, 37, 129, 130, 132, 14, 50; 359/245

(56) References Cited

U.S. PATENT DOCUMENTS

| | | |
|---|---|---|
| 4,674,841 A | 6/1987 | Buzak |
| 5,857,039 A | 1/1999 | Bosc et al. |
| 5,889,900 A | 3/1999 | Hallemeier |
| 5,911,018 A * | 6/1999 | Bischel et al. ............... 385/14 |
| 5,937,115 A * | 8/1999 | Domash ....................... 385/16 |
| 5,940,548 A * | 8/1999 | Yamada et al. .............. 385/14 |
| 6,022,671 A * | 2/2000 | Binkley et al. .............. 430/321 |
| 6,094,291 A * | 7/2000 | Kashyap ........................ 385/2 |

FOREIGN PATENT DOCUMENTS

| | | | |
|---|---|---|---|
| DE | 42 12 372 | 10/1993 | ............ G02F/1/35 |
| EP | 0 818 695 | 1/1998 | ............ G02B/6/34 |
| EP | 0 903 616 | 3/1999 | ........... G02F/1/225 |

OTHER PUBLICATIONS

Optical and Quantum Electronics 22 (1990) 391–416—Tutorial Review—Silica Waveguides on Silicon and their Application to Integrated–Optic Components—Masao Kawachi—NTT Opto–Electronics Laboratories Tokai, Ibaraki 319–11, Japan.

* cited by examiner

*Primary Examiner*—Hemang Sanghavi
(74) *Attorney, Agent, or Firm*—Lee, Mann, Smith, McWilliams, Sweeney & Ohlson

(57) ABSTRACT

An optical waveguide phase adjuster with enhanced sensitivity for instance for use in a Mach Zehnder has a monolithic integrated optics waveguide across which one or more thin, e.g. 10 $\mu$m, slots are made. The slots are filled with material whose refractive index varies strongly with temperature or applied field. The insertion loss of such a slot is small for thicknesses of less than about 25 $\mu$m, but begins to rise ever more rapidly thereafter.

16 Claims, 5 Drawing Sheets

SLOTTED MONOLITHIC OPTICAL WAVEGUIDES

FIELD OF THE INVENTION

This invention relates to the provision of a phase changing effect upon the propagation of guided light. (For the purposes of this specification, the terms 'optical' and 'light' should be understood as pertaining not only to the visible part of the electromagnetic spectrum, but also to the infrared and ultra-violet parts that bound the visible part.)

BACKGROUND TO THE INVENTION

In certain optical communications applications involving the transmission of data over waveguides there is a requirement to effect a change of the phase of propagating light.

A controllable change of phase of light may, for example, be employed in situations in which light launched into one waveguide is caused to interfere optically with that propagating in another waveguide, such as for instance in an optical waveguide Mach Zehnder interferometer used as an optical attenuator or spectrally selective filter.

A Mach Zehnder interferometer of this type is described for instance with particular reference to FIG. 17 of a review paper by Masao Kawachi entitled, 'Silica waveguides on silicon and their application to integrated-optic components', Optical and Quantum Electronics 22 (1990) pp 391–416. This is an example of an interferometer in which phase control is effected using a Joule heater to change the optical path length of one of the interference arms by making use of the fact that the effective refractive index of an integrated optics waveguide exhibits a temperature coefficient ($dn_{eff}/dT$). The sensitivity of such a phase controller is limited by the fact that the thermo-optic coefficient of silica is relatively small ($dn/dT \sim 1\times10^{-5}$, where T is measured in ° C.). Many other materials exhibit significantly larger thermo-optic coefficients, but are difficult to form into low-loss single mode waveguides, and so are not well suited as materials from which to construct an acceptable optical waveguide exhibiting a phase sensitivity large compared with that of a silica waveguide based thermo-optic phase controller.

SUMMARY OF THE INVENTION

An object of the present invention is to provide an optical waveguide phase adjuster of increased sensitivity.

According to a first aspect of the present invention there is provided a monolithic length of optical waveguide divided into a plurality of concatenated waveguide sections by a set of transverse slots, each occupied by a non-waveguiding controllable refractive index element, each slot having a linear dimension, in the direction of propagation of light in the waveguide, that provides, between the two waveguide sections that it separates, a coupling loss not exceeding 0.3 dB.

According to a second aspect of the present invention there is provided a monolithic length of optical waveguide divided into a plurality of concatenated waveguide sections by a set of transverse slots, each occupied by a non-waveguiding controllable refractive index element, each slot having a linear dimension, in the direction of propagation of light in the waveguide, not exceeding 25 μm.

The invention makes use of the fact that, for small separations between the ends of identical waveguides with co-aligned axes, the optical coupling loss is quite small. However, as the separation increases, so the coupling loss begins to increase in a manner which resembles an exponential increase inasmuch as the rate of increase increases with increasing separation. In many instances the optical sensitivity of the medium occupying the gap between the adjacent ends of these two waveguides is so small that the obtaining of the requisite range of phase adjustment in this medium would require a gap thickness much too great to provide an acceptably low coupling loss between the two fibres. By reducing the magnitude of the gap by a factor 'n', while at the same time arranging to have a concatenation of waveguide sections defining a set of 'n' of the smaller gaps optically in series, matters can be arranged to provide an aggregate range of phase adjustment comparable with that of the single large gap. The coupling loss of one of these smaller gaps is much more than n-times smaller than that of the large gap, while the aggregate coupling loss of the series combination of all the smaller gaps is approximately n-times larger than that of a single small gap. Therefore the aggregate coupling loss of the series combination of all the 'n' smaller gaps is much less than the coupling loss of the single large gap, and hence, with the appropriate choice of the factor 'n', the aggregate coupling loss can often be made small enough to be acceptable.

In some circumstances the optical sensitivity of the intervening medium can be so great that a single gap is sufficient on its own to provide the required range of phase adjustment.

According to a third aspect of the present invention there is provided a monolithic length of optical waveguide divided into a pair of concatenated waveguide sections by a single transverse slot occupied by a non-waveguiding controllable refractive index element, the slot having a linear dimension, in the direction of propagation of light in the waveguide, that provides, between the two waveguide sections that it separates, a coupling loss not exceeding 0.3 dB.

According to a fourth aspect of the present invention there is provided a monolithic length of optical waveguide divided into a pair of concatenated waveguide sections by a single transverse slot occupied by a non-waveguiding controllable refractive index element, the slot having a linear dimension, in the direction of propagation of light in the waveguide, not exceeding 25 μm.

Other features and advantages of the invention will be readily apparent from the following description of preferred embodiments of the invention, from the drawings and from the claims.

DETAILED DESCRIPTION OF PREFERRED EMBODIMENTS

Figure 1:
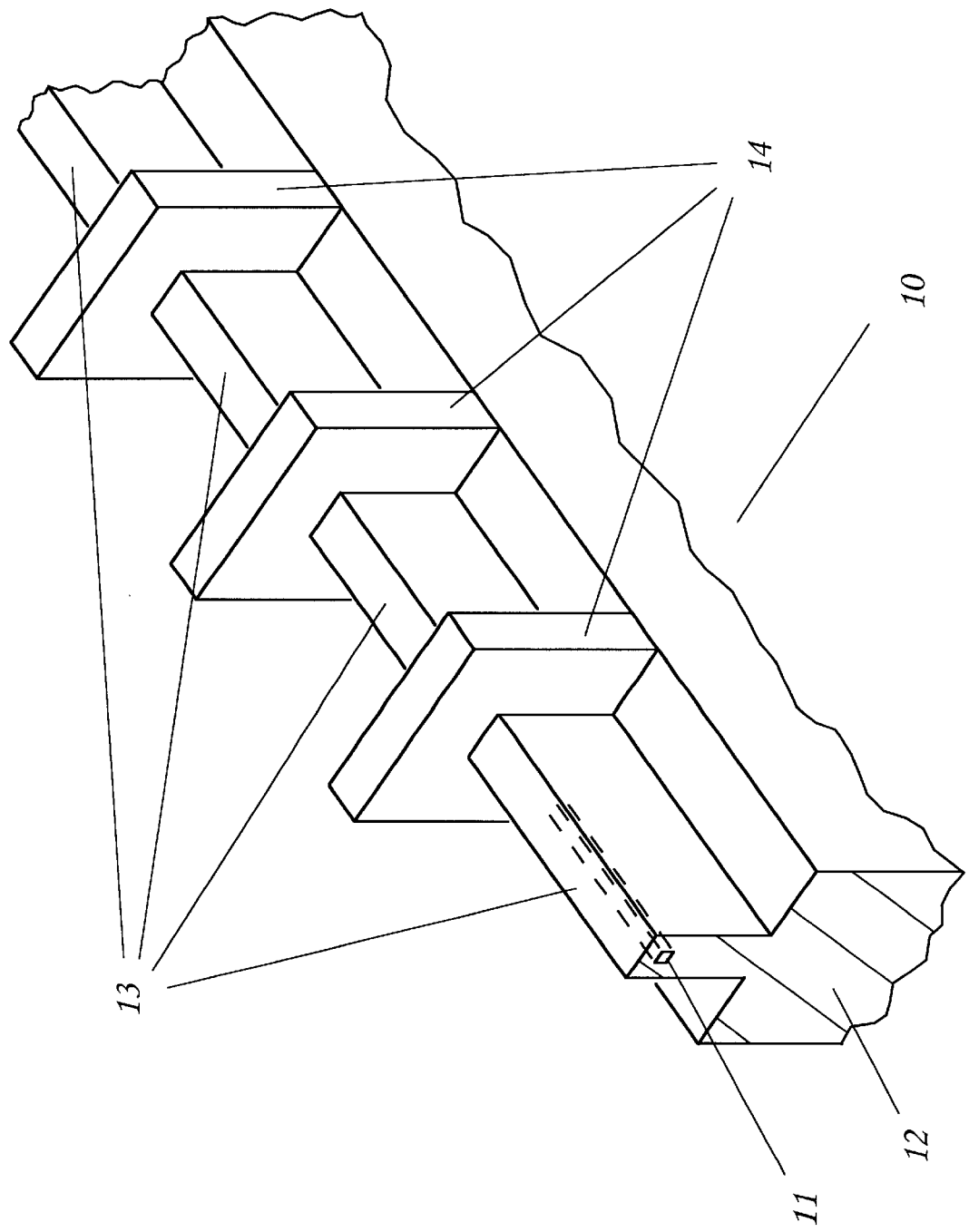
FIG. 1 is a sectioned perspective schematic representation of part of a slotted waveguide phase adjuster.

In FIG. 1 there is schematically depicted the basic elements of an embodiment of the invention. These comprise a monolithic optical waveguide, indicated generally at 10, this waveguide having an optical core 11 surrounded by optical cladding material 12 which has a lower refractive index than that of the core 11. The waveguide is divided into a number of concatenated waveguide sections 13 by a series of slots, each occupied by a non-waveguiding controllable refractive index transducer element 14. (For convenience of illustration only, the core of the waveguide is shown as lying within a portion of the cladding depicted in the form of an upstanding rib–. in some circumstances this may be the actual physical arrangement, but this is not necessarily so.)

Under the assumption that the waveguide 10 possesses a Gaussian radial electric field amplitude distribution ($E=E_{max} \exp-r/w$), the optical coupling loss from one waveguide section 13 to the next can be calculated by evaluating, over the end face of the 'receive' waveguide section, the electric field distribution of the light emanating from the 'launch' waveguide section. The fraction of the power from the launch waveguide that is coupled into the receive waveguide is determined by how well the launch electric field at the receive waveguide end face correlates with the distribution that would give 100% coupling, i.e. the one the receive waveguide would produce at its own end face, were it carrying the same power as the launch waveguide. The relevant equation is given by:

$$T = K\exp\left\{-K\left[\left(\frac{\frac{1}{W_1^2}+\frac{1}{W_2^2}}{2}\right)x^2 + \left(\frac{n^2\pi^2}{2\lambda^2}(W_1^2(z)+W_2^2)\right)\phi^2 + \frac{x\phi z}{W_1^2}\right]\right\} \quad (1)$$

where

T=power transmission coefficient (coupling loss =−10 $\log_{10}$ T)
z=axial distance between the waveguide ends (slot width)
x=lateral offset between the waveguide section axes
φ=angular offset between the waveguide section axes
λ=free space wavelength
n=refractive index of medium between the waveguide ends
$W_1$, $W_2$ =launch and receive spot sizes respectively (i.e. 1/e amplitude half width—equivalent to $1/e^2$ intensity half width)

$$K = \frac{4W_1^2 W_2^2}{(W_1^2+W_2^2)^2 + \frac{\lambda^2 z^2}{n^2\pi^2}}$$

and $$W_1^2(z) = W_1^2\left[1+\left(\frac{\lambda z}{n\pi W_1^2}\right)^2\right]$$

(This last equation describes the width of the launched beam at any z.)

Figure 2:
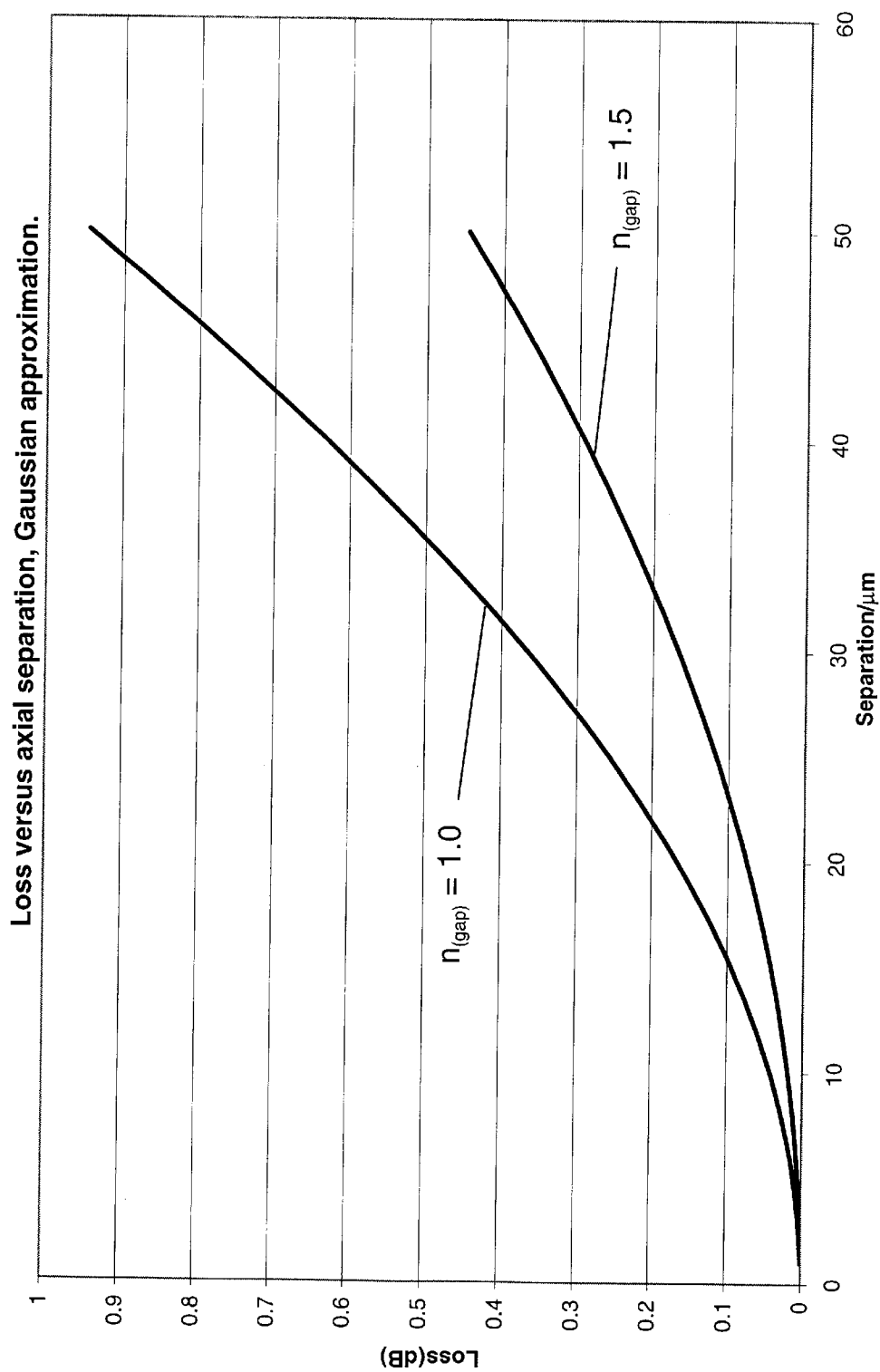
FIG. 2 is a graphical representation depicting calculated per slot coupling loss plotted as a function of slot thickness, for two different values of refractive index of the material occupying the slot.

The above analysis was used to derive the two plots of coupling losses as a function of axial distance, z, as plotted in FIG. 2, assuming matched waveguide sections having a 5 μm spot size, a wavelength λ=1.55 μm, zero lateral and angular offsets, and an inter-waveguide section refractive index, $n_{gap}$=1.0 and 1.5 respectively. These two plots show that for $n_{gap}$=1.0 the coupling loss remains below 0.3 dB for separations up to about 25 μm, while for $n_{gap}$=1.5 the coupling loss at this separation is less than 0.15 dB.

Figure 3:
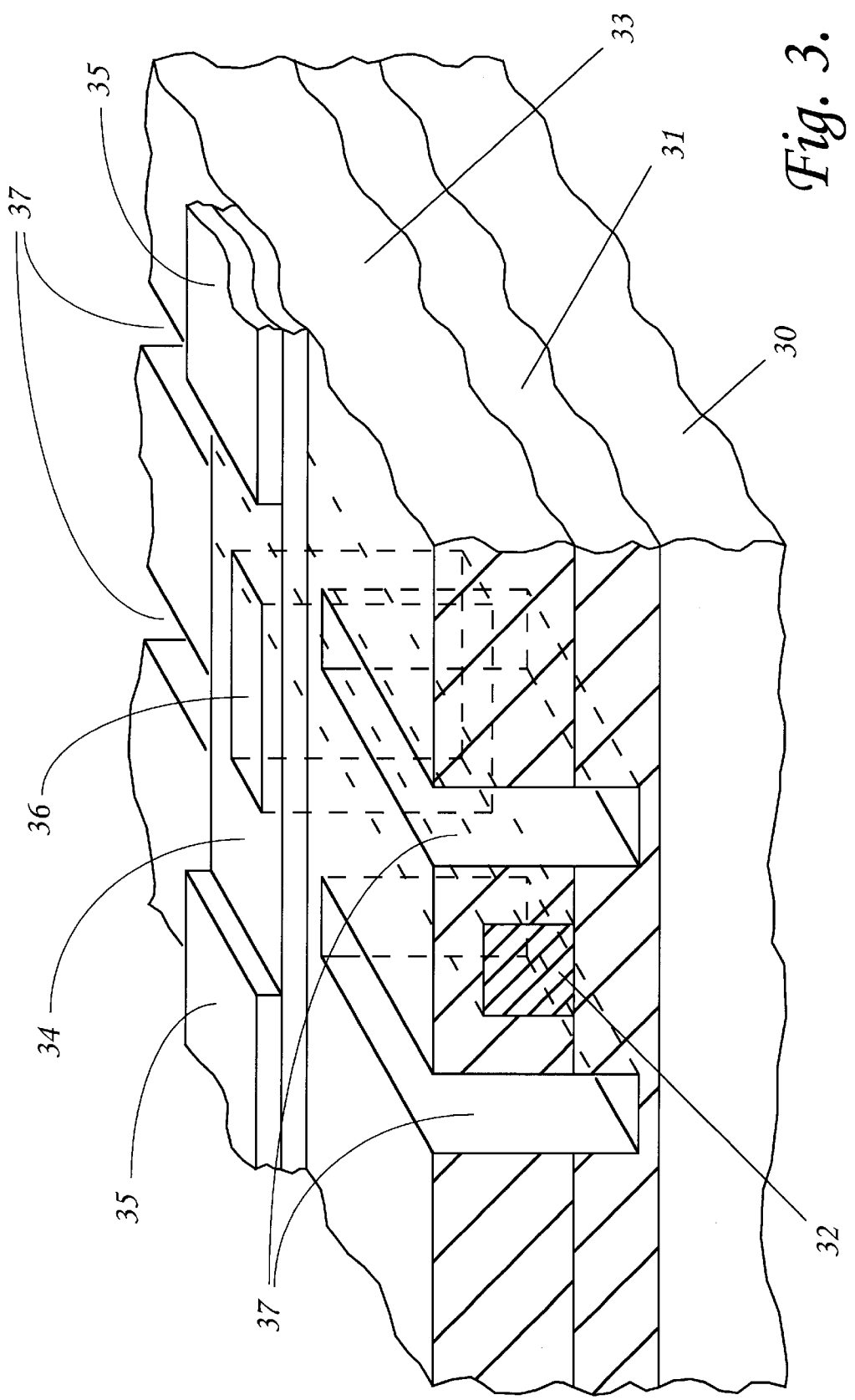
FIG. 3 is a sectioned perspective schematic representation of part of a slotted waveguide thermo-optic effect phase adjuster.

Attention is now directed to FIG. 3, which schematically depicts a part of a thermo-optic phase adjuster. This is built upon a silicon substrate 30. On this substrate is formed a silica buffer layer 31. On the buffer layer is deposited a layer of core glass, which is subsequently patterned and selectively etched to leave a waveguide core 32 which is covered with a layer 33 of cladding glass.

The buffer and cladding glass layers 31 and 33 have matching refractive indices, a value that is less than that of the core glass of the waveguide core 32. The relative glass transition temperatures of the buffer, core glass and cladding glass layers are chosen to keep the distortion of the core, consequent upon deposition of the cladding glass, within acceptable bounds. The thermal expansion coefficient of the cladding glass is preferably matched with that of the silicon substrate. Though the buffer layer has previously been identified as being made of silica, this is not necessarily undoped silica. In a particular example employing a silica coated silicon substrate, the waveguide core 32 may have a 5 μm wide by 6 μm high substantially rectangular cross-section, with the cladding glass layer 33 providing an overcladding 12 μm thick. The core/cladding refractive index difference may typically be about 0.01.

On the cladding glass layer 33 are deposited in turn a layer of electrically resistive material, such as chromium, and of low resistance contact metal, such as gold, these layers being patterned to form respectively a Joule heater 34 and electrical contact pads 35 for that heater. Slots 36 (only one illustrated in FIG. 3) intersecting the waveguide core are etched through the cladding glass layer 33 and well into the underlying buffer glass layer 31. In order not to introduce excessive coupling loss each of these slots is made not more than 25 μm this in the axial direction of the waveguide, and is typically made about 10 μm thick. At the same time as the etching of the slots 36, troughs 37 to flank the waveguide core may optionally be etched to substantially the same depth, the purpose of these troughs being to minimise waveguide birefringence.

The slot 36 is filled with a suitable dielectric material possessing a thermo-optic coefficient whose modulus is large compared with that of silica. One particular example of a suitable material is a low elastic modulus silicone gel also found suitable for use as a damage preventing index matching compound interposed between the opposed ends of optical fibres in abutting type fibre connectors. This silicone gel exhibits a themo-optic coefficient (dn/dT) of about $-4\times10^{-4}$. Because this material filling the slot 36 is a gel, the Joule heating strip is not applied directly to the gel itself, but to the region of the cladding glass layer 33 that bounds that slot. Because the thermo-optic coefficients of the gel and of the cladding glass are of different sign, the factor of improvement in sensitivity, in terms of phase change per unit temperature change, is somewhat diminished in relation to the ratio of the thermo-optic moduli of these two materials. On the other hand, the factor of improvement, expressed in terms of phase change per watt of Joule heating, is enhanced by virtue of the fact that the axial length of the heater is much shorter than is the case when relying solely upon Joule heating of the silica waveguide.

The transducer elements of the phase adjuster of FIG. 3 are constituted by the volumes of silicone gel filling the slots 36, and these volumes rely upon the use of temperature to induce a change of refractive index, and hence a change of phase. It will be apparent however that, with the use of alternative materials, there are alternative ways of inducing that refractive index change. Such change can for instance be brought about by the application of mechanical strain, or by the application of an electric field. An example of the latter will now be described with particular reference to FIG.

4. This embodiment resembles that of FIG. 3 inasmuch as it employs the same structure of silicon substrate 30, buffer layer 31, core 32, cladding layer 33 and slots 36. It is similarly optionally provided with troughs 37. On the other hand, it has no Joule heating strips 35, and the arrangement of its electrical contacts is different: specifically, there are four electrical contacts 45a to 45d associated with the or each slot 36.

The or each slot 36 is filled with a material possessing a large electro-optic coefficient, for instance a polymer dispersed liquid crystal. Such a material can be made to have a sub-micron sized dispersion. By changing the relative potentials applied to the four electrodes of a slot, the molecular axis of the material in the slot can be adjusted by the fringing fields generated by those potentials from an orientation in which the refractive index that the material presents to light propagating in the waveguide axial direction is at a maximum to an orientation in which the refractive index presented is at a minimum.

Figure 4:
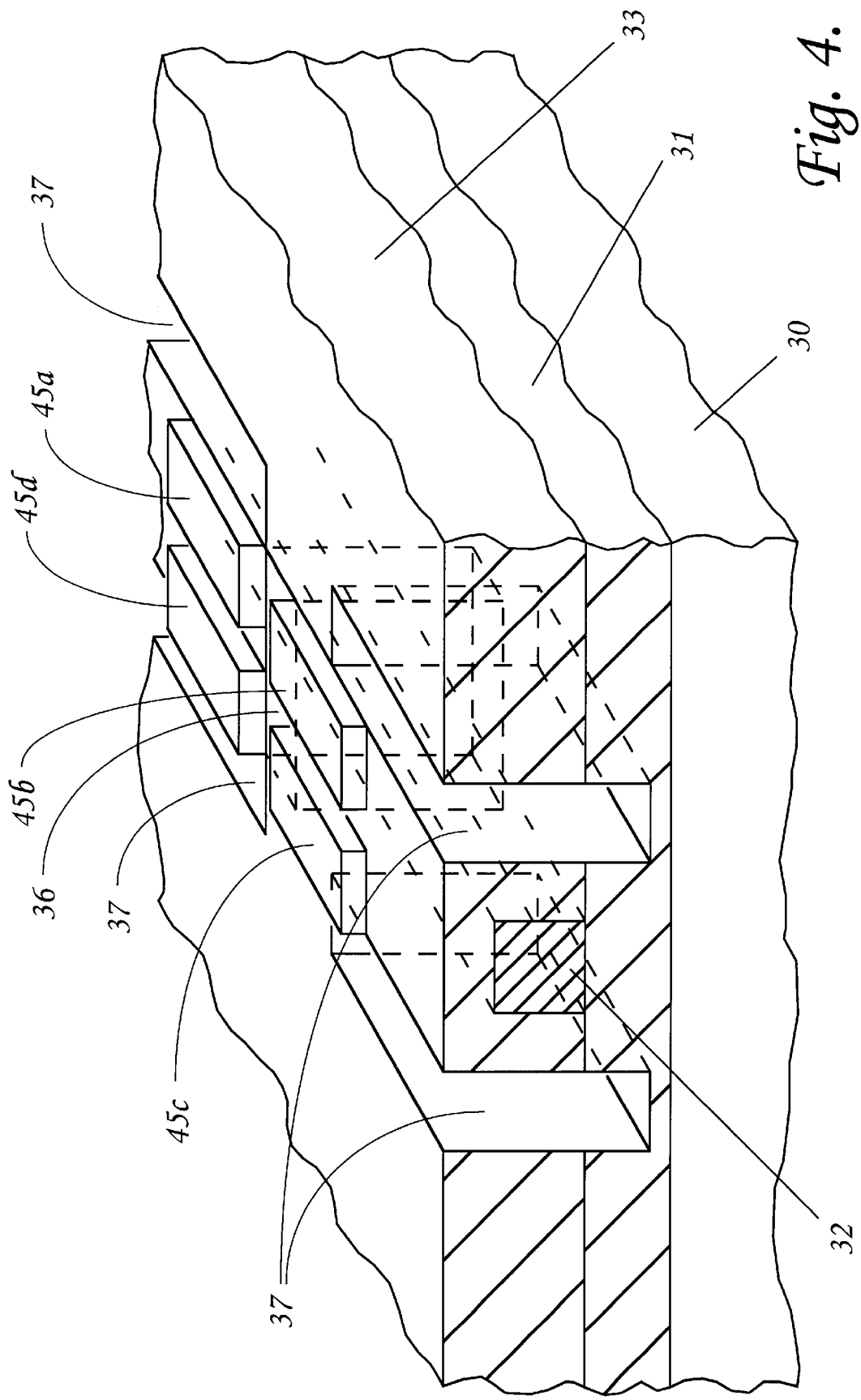
FIG. 4 is a sectioned perspective schematic representation of part of a slotted waveguide electro-optic effect phase adjuster.

Typically the slots 36 of FIGS. 3 and 4 will extend perpendicularly with respect to their waveguide axes but, if this orientation presents an unacceptably large back reflection amplitude, the slots can be aligned obliquely with respect to the waveguide axis. Under these circumstances it may be necessary to offset each waveguide section with respect to its immediate neighbours to take due account of refraction effects at the slot walls.

Figure 5:
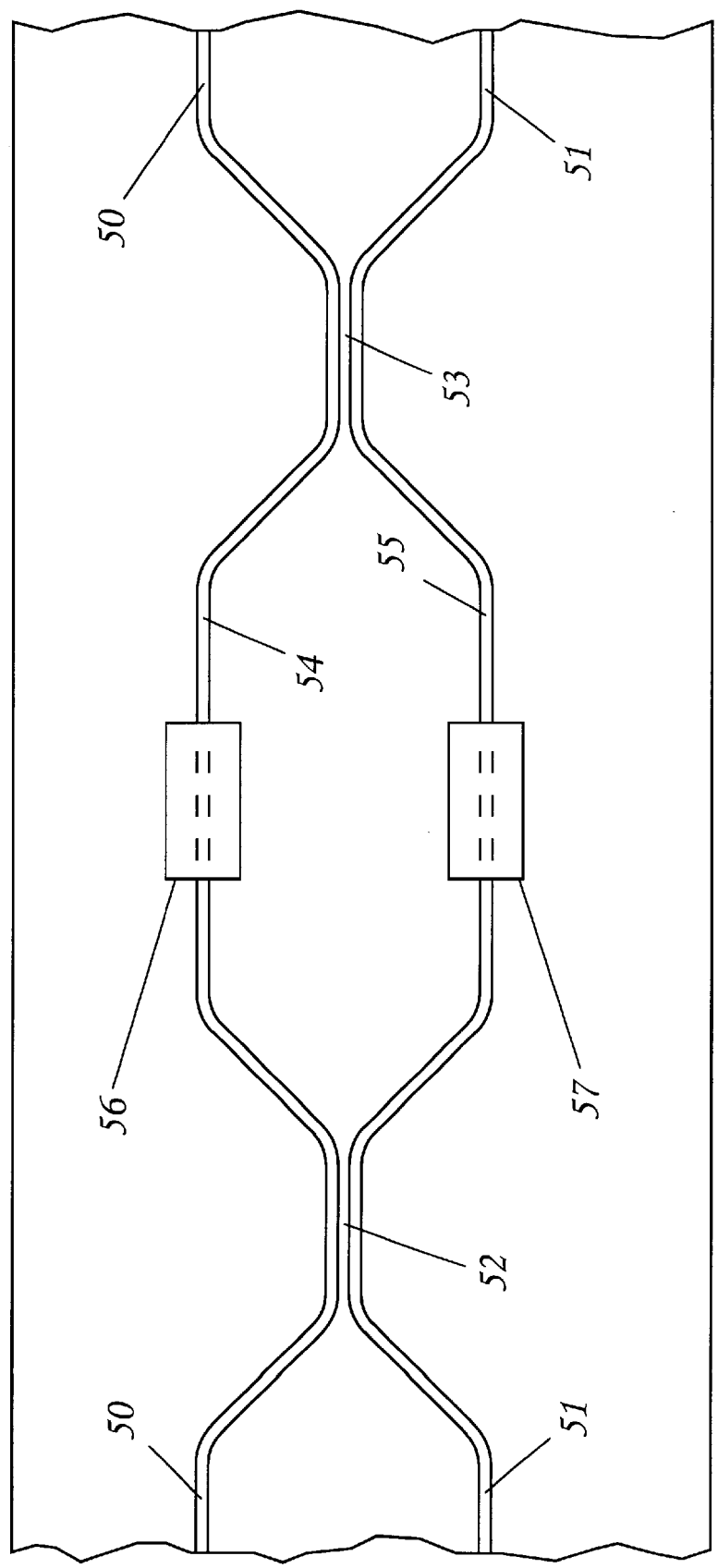
FIG. 5 is a schematic representation of an optical waveguide adjustable optical attenuator having two slotted waveguide phase adjusters arranged in Mach Zehnder interferometer configuration.

One of the particular applications for the phase adjusters described above is in the construction of monolithic Mach Zehnder interferometer configuration waveguide arrays having one of these phase adjusters in each of its two interference arms. Such an array, which may for instance be employed as an electrically controllable variable optical attenuator is depicted in FIG. 5. This array is formed by a monolithic construction of two waveguides 50 and 51 having a pair of regions of close approach at each of which the length and closeness of approach is such as to produce 3 dB coupling strength between the two waveguides. In this way there is formed a pair of interference arms 54 and 55 each one of which is provided with a phase adjuster 56 and 57 as described above with reference to FIGS. 3 or 4.

What is claimed is:

1. A monolithic length of optical waveguide divided into a plurality of concatenated waveguide sections by a set of transverse slots, each occupied by a non-waveguiding controllable refractive index element providing a non-waveguidinq optical coupling between an adjacent pair of said waveguide sections, each slot having a linear dimension, in the direction of propagation of light in the waveguide, that provides, between the two waveguide sections that it separates, a coupling loss not exceeding 0.3 dB.

2. A phase adjuster comprising a monolithic length of optical waveguide as claimed in claim 1, wherein each non-waveguiding controllable refractive index element is an element possessing a thermo-optic coefficient that has a modulus that is larger than that of the thermo-optic coefficient possessed by the waveguide, and wherein a Joule heater registers with each slot.

3. A phase adjuster as claimed in claim 2, wherein each non-waveguiding controllable refractive index element is constituted by a quantity of silicone gel.

4. A phase adjuster comprising a monolithic length of optical waveguide as claimed in claim 1, wherein each non-waveguiding controllable refractive index element is an electro optic element provided with an associated set of electrodes.

5. A phase adjuster as claimed in claim 4, wherein each non-waveguiding controllable refractive index element is constituted by a quantity of a polymer dispersed liquid crystal.

6. A monolithic Mach Zehnder interferometer configuration of optical waveguides having first and second interference arms in each of which is located a phase adjuster comprising a monolithic length of optical waveguide as claimed in claim 1.

7. A monolithic length of optical waveguide divided into a plurality of concatenated waveguide sections by a set of transverse slots, each occupied by a non-waveguiding controllable refractive index element providing a non-waveguiding optical coupling between an adjacent pair of said waveguide sections, each slot having a linear dimension, in the direction of propagation of light in the waveguide, not exceeding 25 μm.

8. A phase adjuster comprising a monolithic length of optical waveguide as claimed in claim 7, wherein each non-waveguiding controllable refractive index element is an element possessing a thermo-optic coefficient that has a modulus that is larger than that of the thermo-optic coefficient possessed by the waveguide, and wherein a Joule heater registers with each slot.

9. A phase adjuster as claimed in claim 8, wherein each non-waveguiding controllable refractive index element is constituted by a quantity of silicone gel.

10. A phase adjuster comprising a monolithic length of optical waveguide as claimed in claim 7, wherein each non-waveguiding controllable refractive index element is an electro optic element provided with an associated set of electrodes.

11. A phase adjuster as claimed in claim 10, wherein each non-waveguiding controllable refractive index element is constituted by a quantity of a polymer dispersed liquid crystal.

12. A monolithic Mach Zehnder interferometer configuration of optical waveguides having first and second interference arms in each of which is located a phase adjuster comprising a monolithic length of optical waveguide as claimed in claim 7.

13. A monolithic length of optical waveguide divided into a pair of concatenated waveguide sections by a single transverse slot occupied by a non-waveguiding controllable refractive index element providing a non-waveguiding optical coupling between said pair of waveguide sections, the slot having a linear dimension, in the direction of propagation of light in the waveguide, that provides, between the two waveguide sections that it separates, a coupling loss not exceeding 0.3 dB.

14. A monolithic Mach Zehnder interferometer configuration of optical waveguides having first and second interference arms in each of which is located a phase adjuster comprising a monolithic length of optical waveguide as claimed in claim 13.

15. A monolithic length of optical waveguide divided into a pair of concatenated waveguide sections by a single transverse slot occupied by a non-waveguiding controllable refractive index element providing a non-waveguidinq optical coupling between said pair of waveguide sections, the slot having a linear dimension, in the direction of propagation of light in the waveguide, not exceeding 25 μm.

16. A monolithic Mach Zehnder interferometer configuration of optical waveguides having first and second interference arms in each of which is located a phase adjuster comprising a monolithic length of optical waveguide as claimed in claim 15.

* * * * *